US009458691B2

(12) United States Patent
Rowe et al.

(10) Patent No.: US 9,458,691 B2
(45) Date of Patent: Oct. 4, 2016

(54) METAL CHEVRON AXIAL SEAL

(71) Applicant: Parker-Hannifin Corporation, Cleveland, OH (US)

(72) Inventors: Gordon Rowe, Southington, CT (US); Kermit Bierut, Monroe, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 279 days.

(21) Appl. No.: 14/153,611

(22) Filed: Jan. 13, 2014

(65) Prior Publication Data
US 2014/0124193 A1 May 8, 2014

Related U.S. Application Data

(63) Continuation of application No. 14/003,116, filed as application No. PCT/US2011/041025 on Jun. 20, 2011, now abandoned.

(60) Provisional application No. 61/449,352, filed on Mar. 4, 2011.

(51) Int. Cl.
| | | |
|---|---|---|
| *E21B 37/02* | (2006.01) | |
| *E21B 33/10* | (2006.01) | |
| *E21B 33/12* | (2006.01) | |
| *F16J 15/20* | (2006.01) | |

(52) U.S. Cl.
CPC ........... *E21B 33/10* (2013.01); *E21B 33/1212* (2013.01); *F16J 15/20* (2013.01)

(58) Field of Classification Search
CPC ..................... E21B 2033/005; E21B 33/1208; E21B 37/02
See application file for complete search history.

(56) References Cited

U.S. PATENT DOCUMENTS

| | | |
|---|---|---|
| 4,131,287 A | 12/1978 | Gunderson et al. |
| 4,234,197 A | 11/1980 | Amancharla |
| 4,372,393 A | 2/1983 | Baker |
| 4,406,469 A | 9/1983 | Allison |
| 4,433,847 A | 2/1984 | Weinberg |
| 4,473,231 A | 9/1984 | Tilton et al. |
| 4,588,030 A | 5/1986 | Blizzard |
| 4,771,831 A | 9/1988 | Pringle et al. |

(Continued)

FOREIGN PATENT DOCUMENTS

| | | |
|---|---|---|
| GB | 2150236 | 6/1985 |
| WO | 2008116034 | 9/2008 |

OTHER PUBLICATIONS

International Search Report and Written Opinion for corresponding patent application No. PCT/US2011/041025 dated Feb. 25, 2013.
IPRP for corresponding patent application No. PCT/US2011/041025 dated Oct. 8, 2013.

*Primary Examiner* — Catherine Loikith
(74) *Attorney, Agent, or Firm* — Renner, Otto, Boisselle & Sklar, LLP

(57) ABSTRACT

A subterranean wellbore assembly includes an outer cylindrical wall and an inner cylindrical wall cooperatively defining an annular space. A seal assembly is disposed within the annular space. The seal assembly includes chevron seals. Each chevron seal includes a central portion and two axially and radially extending wing portions. Chevron seals may be of polymeric PEEK material or of nickel based material. Other seal assemblies may be arranged in the annular space in place of the seal assembly.

22 Claims, 6 Drawing Sheets

(56) References Cited

U.S. PATENT DOCUMENTS

| | | |
|---|---|---|
| 5,131,666 A | 7/1992 | Hutchens |
| 5,309,993 A | 5/1994 | Coon et al. |
| 6,250,604 B1 | 6/2001 | Robert |
| 2008/0061510 A1 | 3/2008 | Li et al. |
| 2008/0230236 A1* | 9/2008 | Wright ............ E21B 33/128 166/387 |

* cited by examiner

METAL CHEVRON AXIAL SEAL

CROSS REFERENCE TO RELATED APPLICATIONS

This application is a continuation of U.S. application Ser. No. 14/003,116, filed Sep. 4, 2013, which is a national phase of International Application No. PCT/US2011/41025, filed Jun. 20, 2011, and published in the English language, which claims priority to U.S. Provisional Application No. 61/449,352, filed Mar. 4, 2011, the entirety of which are incorporated herein by reference.

TECHNICAL FIELD

This invention relates to a chevron axial seal assembly for high pressure and/or high temperature subterranean applications.

BACKGROUND OF THE INVENTION

Chevron axial seal assemblies are used to provide a fluid barrier between oppositely facing generally cylindrical concentric walls, particularly in subterranean applications under conditions of high pressure and/or high temperature. Known chevron axial seal assemblies are shown, for example, in U.S. Pat. Nos. 4,234,197; 4,406,469; 4,433,847; 4,811,959; 5,131,666; 5,156,220; 5,297,805; 5,309,993; 6,406,028; 7,401.788; 7,445,047; and in U.S. Patent Publications 2009/0277642 and 2003/0222410. A radially inner part of the chevron seal assembly engages and seals against the radially inner cylindrical wall, and a radially outer part of the chevron seal assembly engages and seals against the radially outer cylindrical wall. Chevron seals of this general type may be used in static and/or dynamic applications.

Chevron seal assemblies may include seal subassemblies that have multiple components that provide various functions. Spacer rings separate adjacent unidirectional seal subassemblies, each of which may seal in a direction opposite the other, or separate other components. Scraper rings wipe or scrape debris from a surface that is to be sealed. Sealing rings provide the described sealing engagement between the concentric walls. Anti-extrusion rings, also called back up rings, prevent less rigid rings from extruding between the concentric cylindrical walls that are being sealed.

SUMMARY OF THE INVENTION

The present invention provides an annular seal assembly for a subterranean assembly that has generally cylindrical inner and outer generally concentric surfaces and an annular space between the surfaces. The subterranean assembly may be a wellbore assembly.

The seal assembly includes at least one chevron seal. The chevron seal includes an annular central body and two annular wings extending radially and axially from the central body. One of the wings extends radially inwardly from the body to a distal annular end and is arranged for sealing engagement with the generally cylindrical inner surface. The other wing extends radially outwardly from the body to another distal annular end and is arranged for sealing engagement with the generally cylindrical outer surface. The chevron seal is of metal or metal alloy.

The first mentioned wing may be arranged for engagement with the generally cylindrical inner surface at a location immediately adjacent the distal annular end of the first mentioned wing. The second mentioned wing may be arranged for engagement with the generally cylindrical outer wall at a location immediately adjacent the distal annular end of the second mentioned wing. Each wing may extend substantially in a straight line from the central body to its distal end. Each wing may be of substantially uniform thickness from the central body to its distal end.

Another chevron seal may also include an annular central body and two annular wings extending radially and axially from the central body. One of the wings of the other chevron seal may extend radially inwardly from the body to a distal annular end for sealing engagement with the generally cylindrical inner surface. The other wing of the other chevron seal may extend radially outwardly from the body to a distal annular end for sealing engagement with the generally cylindrical outer surface. The other chevron seal is of polymeric material.

An annular scraper ring may be longitudinally aligned with the first mentioned chevron seal or may be used with other seals or by itself. The scraper ring may include inner and outer conical surfaces extending between axially separated distal ends. The juncture of the inner conical surface and one of the scraper ring distal ends defines an inner annular scraper for engagement with the generally cylindrical inner surface. The juncture of the outer conical surface and the other of the scraper ring distal ends defines an outer annular scraper arranged for engagement with the generally cylindrical outer conical surface. Alternatively, the scraper ring may include two annular wings extending radially and axially from a central body, with a cooperating scraper retainer projecting axially against the central body and projecting both axially and radially against the wings.

An annular spacer ring may be longitudinally aligned with the first mentioned chevron seal central portion. The spacer ring is of metal or metal alloy and is of integral unitary construction with the first mentioned chevron seal.

The central body of the polymeric chevron ring may be nested within the wings of the metal chevron wings. The central body of the polymeric chevron ring is substantially adjacent the central body of the metal chevron wing. A major portion of the material of both wings of the polymeric chevron seal is disposed between the wings of the metal chevron seal. The thickness of each wing of the metal chevron seal is substantially uniform from the region of the wing adjacent the central body to the free distal end. The thickness of the central portion of the metal chevron seal is greater than the thickness of the wings.

The annular seal assembly further may include still another metal chevron ring and still another polymeric chevron ring. The wings of the first mentioned metal chevron seal extend axially in the same direction as the wings of the other metal chevron seal to provide a unidirectional seal assembly. The wings of the first mentioned metal chevron seal extend axially in the opposite direction as the wings of the other metal chevron seal to provide a bidirectional seal assembly.

The invention further provides various ones of the features and structures and methods described in the detailed description and in the claims set out below, alone and in combination, and the claims are incorporated by reference in this summary of the invention.

BRIEF DESCRIPTION OF THE DRAWINGS

Embodiments of this invention will now be described in further detail with reference to the accompanying drawings, in which.

DETAILED DESCRIPTION OF THE INVENTION

Figure 1:
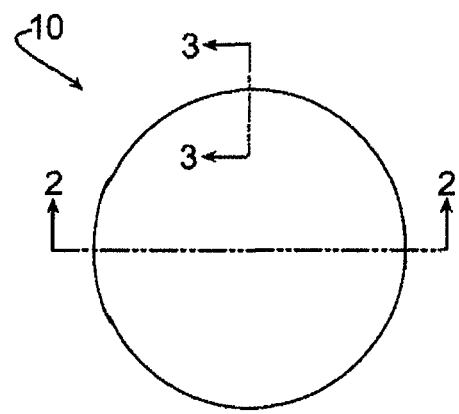
FIG. 1 is a top view schematic illustration of a subterranean assembly that includes a seal assembly according to a first preferred embodiment of the present invention.
Figure 2:
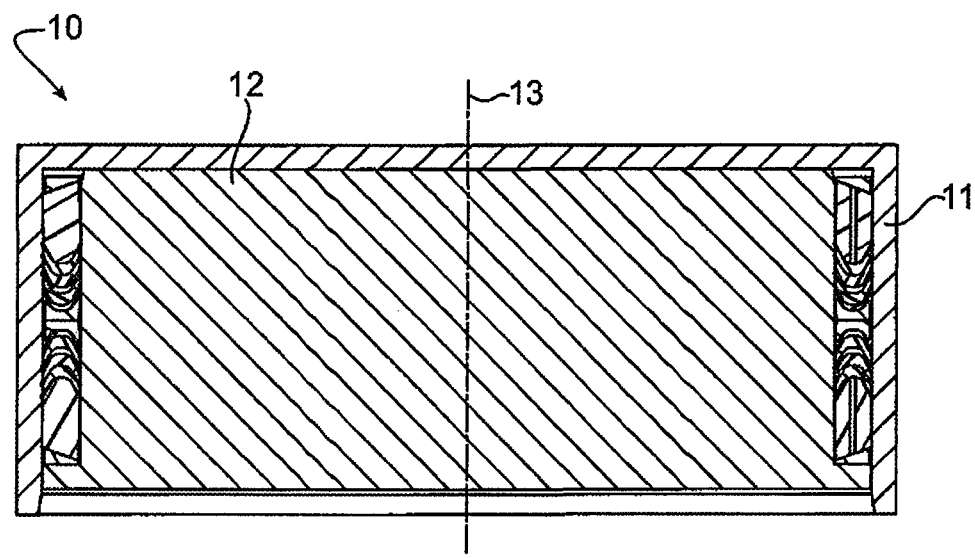
FIG. 2 is an enlarged longitudinal cross sectional view of the subterranean assembly that includes the seal assembly according to the first preferred embodiment of the present invention, taken along reference view line 2-2 in the FIG. 1 schematic illustration.
Figure 3:
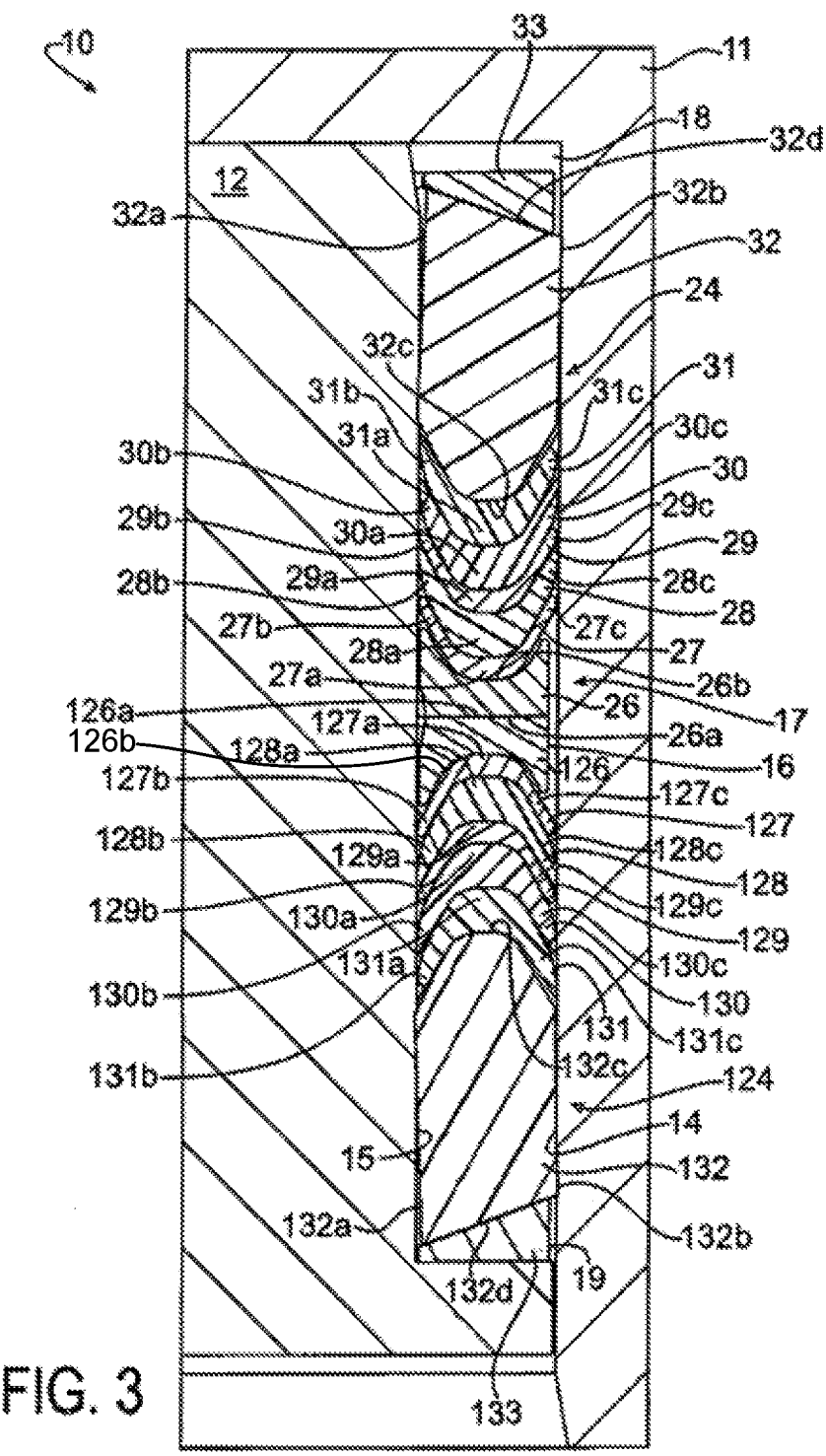
FIG. 3 is a further enlarged longitudinal cross sectional view of the subterranean assembly that includes the seal assembly according to the first preferred embodiment of the present invention, taken along reference view line 3-3 in the FIG. 1 schematic illustration.

Referring now to the drawings in greater detail, FIGS. 1-3 illustrate a subterranean assembly 10 according to a first preferred embodiment of the present invention. As used herein, the term subterranean assembly means any generally cylindrical assembly that includes inner and outer generally concentric walls and that extends into or is disposed within the earth, including beneath land and/or beneath water, for containing or carrying fluids or fluid and solid mixtures, including but not limited to wells, casings, valves or tools in oil fields or other applications.

The assembly 10 includes a generally cylindrical exterior member 11 and a generally cylindrical interior member 12. The exterior and interior members 11 and 12 may be components of any subterranean assembly, and in the embodiment illustrated in FIGS. 1-3 the members 11 and 12 are portions of a subterranean oilfield wellbore assembly. The members 11 and 12 are concentric and have a longitudinal axis 13. The exterior member 11 is of a suitable material, such as for example a nickel based alloy material including Inconel 718 material, and includes a generally cylindrical radially inwardly facing exterior wall or surface 14. The interior member 12 is also of a suitable material, such as the same nickel based material of the exterior member 11, and includes a generally cylindrical radially outwardly facing interior wall or surface 15. The exterior and interior walls 14 and 15 define a generally cylindrical annular space 16. An annular axial seal assembly 17 is disposed in the space 16 and seals against both the exterior wall 14 and the interior wall 15. The annular seal assembly 17 separates the space 16 into a first annular region 18 on one side of the seal assembly 17 and a second annular region 19 on the other side of the seal assembly 17.

As shown in FIG. 3, the seal assembly 17 includes longitudinally abutting and longitudinally aligned annular seal subassemblies 24 and 124. The subassembly 24 includes an annular spacer ring 26, annular chevron seals 27-31, an annular scraper ring 32, and annular retaining washer 33, all of which are longitudinally aligned. The subassembly 124 is identical to the subassembly 24 but is installed in a direction opposite the direction of the subassembly 24, as shown in the drawings. The subassembly 124 includes an annular spacer ring 126, annular chevron seals 127-131, annular scraper ring 132, and annular retaining washer 133, all of which are longitudinally aligned. The subassemblies 24 and 124, and all individual components of the subassemblies 24 and 124, are slidably disposed in the annular space 16. The annular spacer rings 26, 126 are preferably of a suitable steel or stainless steel material. The spacer rings 26, 126 slide along the interior wall 15 and engage one another as shown in the drawings. The spacer rings 26, 126 respectively include generally flat axial end faces 26a and 126a that engage one another and generally concave axial end faces 26b and 126b that engage their adjacent chevron seals 27, 127. The annular retaining washers 33, 133 are also preferably of a suitable steel or stainless steel material.

The scraper rings 32, 132 include slightly conical radially inner walls 32a and 132a and slightly conical radially outer walls 32b and 132b, respectively. The walls 32a, 132a and 32b, 132b terminate at distal end walls 32c, 32d and 132c, 132d, respectively. The distal end walls 32c and 132c are convex and provide support for their respective adjacent chevron seals 31 and 131, respectively. The distal end walls 32d and 132d engage retaining washers 33, 133. When the seal assembly 17 is not installed in the space 16 and before such installation, the scraper rings 32, 132 are in a free or unrestrained state in which each has a radial extend that is substantially in excess of the radial extent of the annular space 16. When the seal assembly 17 is assembled in the space 16, the scraper rings 32 and 132 each become resiliently deformed or spring loaded against both the inner wall 15 and the outer wall 14. This spring loading enables the scraper rings 32 and 132 to remove foreign materials, such as dirt or mud, from the walls 14 and 15 during axial movement of the seal assembly 17 in the annular space 16.

The chevron seals 27-31 and 127-131 each include an annular central body 27a-31a and 127a-131a, respectively. The central bodies 27a-31a and 127a-131a are each disposed substantially in the radial central region of the annular space 16 and are each spaced from the interior wall 14 and exterior wall 15. The chevron seals 27-31 and 127-131 each also includes an annular inner wing 27b-31b and 127b-131b which extends axially from and radially inwardly from its central body. The chevron seals 27-31 and 127-131 each further includes an annular outer wing 27c-31c and 127c-131c which extends axially from and radially outwardly from its central body. The inner wings and outer wings of each chevron seal 27-31 and 127-131 each terminate at a distal free end. Each inner wing 27b-31b and 127b-131b sealingly engages the inner wall 15 at a location immediately adjacent its distal end. Each outer wing 27c-31c and 127c-131c sealingly engages the outer wall 14 at a location immediately adjacent its distal end. When the seal assembly 17 is not installed in the space 16 and before such installation, each chevron seal has a free or unrestrained radial extent between the free distal ends of its inner and outer wings that is substantially greater than the radial extent of the space 16. When the seal assembly 17 is installed in the space 16 as shown in the drawings, the inner and outer wings of each chevron seal are deflected toward one another and resiliently deformed or spring loaded against its adjacent wall 15 or 14.

The chevron seals 28 30, 31 and 128, 130, 131 are each of a polymeric material. Preferably, these seals are each of a PolyEtherEtherKetone (PEEK) material. The thickness of the central portion of each polymeric chevron seal is greater than the thickness of the wings of each polymeric chevron seal, and the wings of each polymeric chevron seal tapers from a relatively thicker portion adjacent the central portion to a relatively thinner portion at its distal free end. The chevron seals 27, 29 and 127, 129 are each of metal or metal alloy material. Preferably, these seals are each of a nickel based alloy material. In the first preferred embodiment shown in FIGS. 1-3, the nickel based alloy material is Inconel 718 material, having a yield strength in the range of approximately 125 ksi. The wings of each metal chevron seal are of substantially uniform thickness from a region adjacent the central portion to the distal free end. The wings of each metal chevron seal extend substantially in a straight line from the region adjacent the central portion to the distal free end. The central portions 28*a*, 30*a* and 128*a*, 130*a* of the polymeric chevron seals 28, 30, 128 and 130 are disposed or nested entirely between the wings of their adjacent metal chevron seals 27, 29 and 127, 129, respectively. Preferably, these central portions of the polymeric chevron seals are disposed substantially adjacent the central portions of their adjacent metal chevron seals. Further, a major portion of the volume of the material of the wings 28*c*, 28*d*, 30*c*, 30*d*, 128*c*, 128*d*, 130*c*, and 130*d* of the chevron seals is also disposed within the wings of their adjacent metal chevron seals.

The seal assembly 17 provides a bidirectional seal between the inner wall 15 and the outer wall 14 of the assembly 10. The subassembly 24 seals in one direction when exposed to a pressure that is greater in the region 18 than in the region 19. The subassembly 124 seals in the opposite direction when exposed to a pressure that is greater in the region 19 than in the region 18. If sealing in only one direction is required by the application, one of the subassemblies 24, 124 may be used without the other to provide a unidirectional seal assembly. The combination of at least one polymeric chevron seal with at least one metal chevron seal, and preferably the combination of two or more polymeric chevron seals with two or more metal chevron seals as illustrated in FIGS. 1-3 provides a subterranean seal assembly that maintains sealing function at high pressure differentials in either direction across the seal assembly up to about 2069 bar (30,000 si) and at temperatures up to about 196 degrees centigrade (385 degrees Fahrenheit) even after repeated assembly into and disassembly out of the annular space 16.

Figure 4:
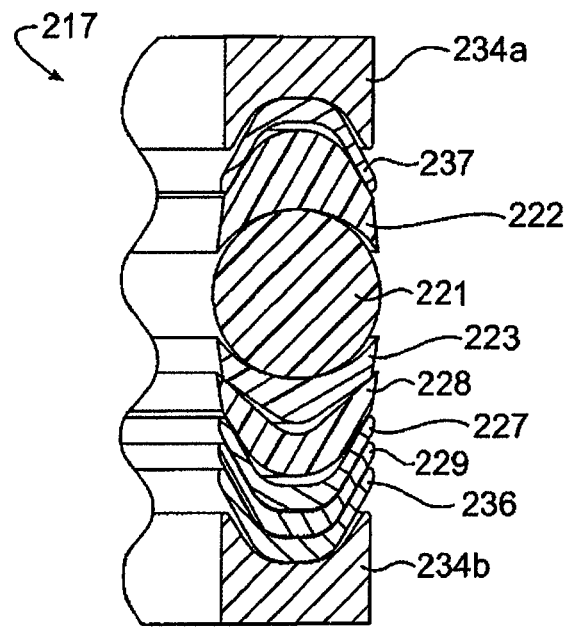
FIG. 4 is a longitudinal cross sectional view of a second embodiment of a subterranean seal assembly according to certain aspects of the present invention.

Referring now to FIG. 4, a second embodiment of a seal assembly 217 according to certain aspects of this invention is illustrated. The seal assembly 217 is illustrated in a free or un-deformed state, and the seal assembly 217 may be installed in the subterranean assembly illustrated in FIG. 2 in place of the seal assembly 17. Since the axial length of the assembly 217 is less than the axial length of the assembly 17, the cavity illustrated in FIG. 2 would preferably have a shorter axial extent when used with the assembly 217. The seal assembly 217 includes an O-ring seal 221, anti-extrusion back up rings 222 and 223, chevron seals 227, 228, 229, 236, 237, and spacers 234*a* and 234*b*. The O-ring 221 may be of any suitable thermosetting or thermoplastic polymeric material, and in the second preferred embodiment the O-ring is preferably of Perfluoroelastomer elastomeric compound. The anti-extrusion back up rings 222 and 223 prevent extrusion of the O-ring 221 under high pressure conditions and are preferably of a polymeric material such as PEEK. The chevron seal 228 is of polymeric material such as PEEK, and is preferably identical to the polymeric chevron seals 28, 30, 31 and 128, 130, 131 described above with reference to FIGS. 1-3. The chevron seals 227, 229, 236 and 337 are of metal and are preferably identical to the metal chevron seals 27 and 29 described above with reference to FIGS. 1-3.

The seal assembly 217 provides a bidirectional seal between the inner wall 15 and the outer wall 14 when used in place of the seal assembly 17 shown in FIGS. 1-3 and described above. The subassembly consisting of the O-ring seal 221, back up ring 223, and chevron seals 228, 227, 229 and 235 seals against fluid leakage at a relatively higher pressure in one direction when exposed to a pressure that is greater in the region 18 than in the region 19. The subassembly consisting of the O-ring seal 221, back up ring 222 and chevron seal 237 seals against relatively lower pressure in the opposite direction when exposed to a pressure that is greater in the region 19 than in the region 18 The combination of at least one polymeric chevron seal (that is, the chevron seal 228) with at least one metal chevron seal and preferably the two or more metal chevron seals (that is, the chevron seals 227, 229 and 235) provides a subterranean seal assembly that maintains sealing function at high pressure differentials across the seal assembly and at high temperatures even after repeated assembly into and disassembly out of the annular space 16.

Figure 5:
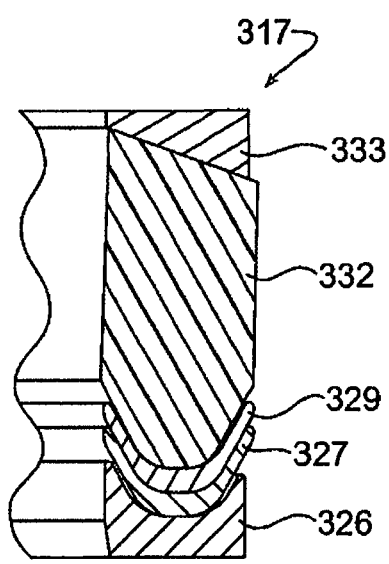
FIG. 5 is a longitudinal cross sectional view of a third embodiment of a subterranean seal assembly according to certain aspects of the present invention.

Referring now to FIG. 5, a third embodiment of a seal assembly 317 according to certain aspects of this invention is illustrated. The seal assembly 317 is illustrated in a free or un-deformed state, and the seal assembly 317 may be installed in the subterranean assembly illustrated in FIG. 2 in place of the seal assembly 17. Since the axial length of the assembly 317 is less than the axial length of the assembly 17, the cavity illustrated in FIG. 2 would preferably have a shorter axial extent when used with the assembly 317. The seal assembly 317 includes a metal spacer 326, chevron seals 327 and 329, a scraper 332 and a retainer washer 333. The metal spacer 326 is identical to the spacer 26 described above with reference to FIGS. 1-3. The chevron seals 327 and 329 are identical to the chevron seals 27 and 29 described above with reference to FIGS. 1-3. The scraper 332 and retainer washer 333 are identical to the scraper 32 and retainer washer 33, respectively, described above.

The seal assembly 317 provides a unidirectional seal between the inner wall 15 and the outer wall 14 when used in place of the seal assembly 17 shown in FIGS. 1-3 and described above. The subassembly consisting of the chevron seals 327 and 329 seals against fluid leakage at a relatively higher pressure in one direction when exposed to a pressure that is greater in the region 18 than in the region 19. If sealing in two directions is required by the application, a second assembly facing in a direction opposite the direction of the seal assembly 317 may be added to the assembly shown in FIG. 5, in the manner illustrated in FIGS. 1-3. The combination of two or more metal chevron seals (that is, the chevron seals 327 and 329) provides a subterranean seal assembly that maintains sealing function at high pressure differentials across the seal assembly and at high temperatures even after repeated assembly into and disassembly out of the annular space 16.

Figure 6:
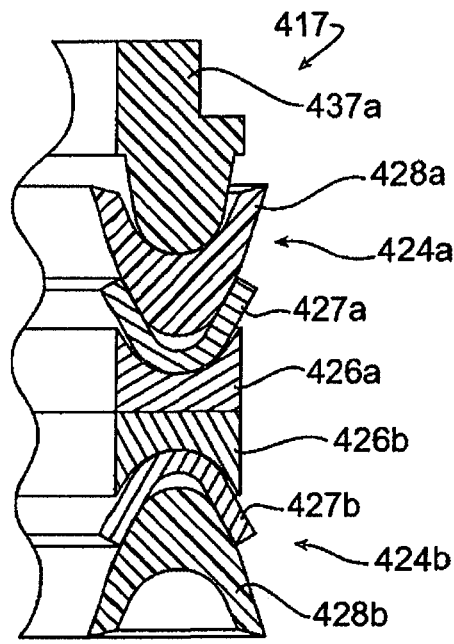
FIG. 6 is a longitudinal cross sectional view of a fourth embodiment of a subterranean seal assembly according to certain aspects of the present invention.

Referring now to FIG. 6, a fourth embodiment of a seal assembly 417 according to certain aspects of this invention is illustrated. The seal assembly 417 is illustrated in a free or un-deformed state, and the seal assembly 417 may be installed in the subterranean assembly illustrated in FIG. 2 in place of the seal assembly 17. Since the axial length of the assembly 417 is less than the axial length of the assembly 17, the cavity illustrated in FIG. 2 would preferably have a shorter axial extent when used with the assembly 417. The seal assembly 417 includes subassemblies 424a and 424b. Subassembly 424a includes a spacer 426a, chevron seals 427a and 428a, and a spacer 437a. Subassembly 424b includes a spacer 426b and chevron seals 427b and 428b. A spacer (not shown) similar to spacer 437a may be used with subassembly 424b, or another member having a nose portion that extends between the wings of chevron seal 428b may alternatively be provided. The spacers 426a and 426b are identical to the spacers 26 and 126. The spacer 437a is preferably of the same material as the spacers 426a and 426b. The chevron seals 427a and 427b are identical to the chevron seals 27 and 127.

Figure 7:
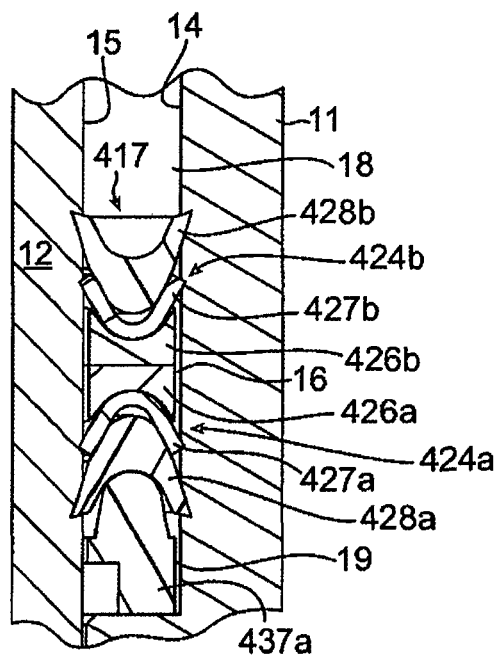
FIG. 7 is a longitudinal cross sectional view of a subterranean assembly that includes the seal assembly shown in FIG. 6.

The seal assembly 417 provides a bidirectional seal between the inner wall 15 and the outer wall 14 when used in place of the seal assembly 17 shown in FIGS. 1-3 and described above. The seal assembly when so used may be mounted in the direction illustrated in FIG. 6 or may be flipped 180 degrees. This assembled condition is illustrated in FIG. 7. In FIG. 7, the distal free ends of each chevron seal are illustrated in their free or unrestrained condition, to illustrate the elastic deformation of the chevron seals in the installed condition. Each inner wing of each chevron seal sealingly engages and is constrained against radially inward movement by the inner wall 15 in the installed condition at a location immediately adjacent its distal free end. Each outer wing of each chevron seal sealingly engages and is constrained against radially outward movement by the outer wall 14 in the installed condition at a location immediately adjacent its distal free end. When the seal assembly 417 is not installed in the space 16 and before such installation, each chevron seal has a free or unrestrained radial extent between the free distal ends of its inner and outer wings that is substantially greater than the radial extent of the space 16. When the seal assembly 417 is installed in the space 16 as shown in FIG. 7, the inner and outer wings of each chevron seal are deflected toward one another and resiliently deformed or spring loaded against its adjacent wall 15 or 14. Also, in this installed condition, the central portion of each polymeric chevron seal extends between the wings of its adjacent metal chevron seal, to assist in locating and aligning the metal chevron seal while the metal chevron seal prevents extrusion or excessive deformation of the polymeric chevron seal.

The subassembly 424b seals against fluid leakage in one direction when exposed to a pressure that is greater in the region 18 than in the region 19. The subassembly 424a seals against pressure in the opposite direction when exposed to a pressure that is greater in the region 19 than in the region 18. If sealing in only one direction is required by the application, one of the subassemblies may be used without the other to provide a unidirectional seal assembly. The combination of at least one polymeric chevron seal (that is, the chevron seal 428a or 428b) with at least one metal chevron seal (that is, the chevron seal 427a or 427b) provides a subterranean seal assembly that maintains sealing function at high pressure differentials across the seal assembly and at high temperatures even after repeated assembly into and disassembly out of the annular space 16.

Figure 8:
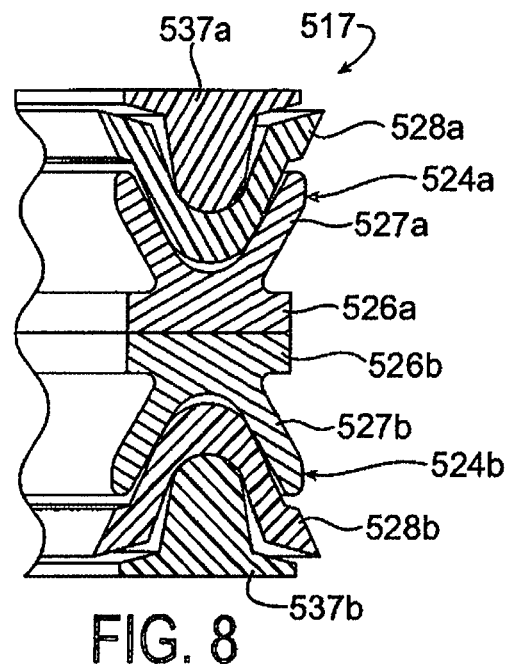
FIG. 8 is a longitudinal cross sectional view of a fifth embodiment of a subterranean seal assembly according to certain aspects of the present invention.

Referring now to FIG. 8, a fifth embodiment of a seal assembly 517 according to certain aspects of this invention is illustrated. The seal assembly 517 is illustrated in a free or un-deformed state, and the seal assembly 517 may be installed in the subterranean assembly illustrated in FIG. 2 in place of the seal assembly 17. Since the axial length of the assembly 517 is less than the axial length of the assembly 17, the cavity illustrated in FIG. 2 would preferably have a shorter axial extent when used with the assembly 517. The seal assembly 517 includes subassemblies 524a and 524b. Subassembly 524a includes a spacer 526a, chevron seals 527a and 528a, and a spacer 537a. Subassembly 524b includes a spacer 526b, chevron seals 527b and 528b, and a spacer 537b. The chevron seals 527a and 527b are of metal and are preferably each of the same metal and configuration as the metal chevron seals 27, 29. The metal chevron seals 527a and 527b are each of integral one piece construction with its adjacent spacer 526a and 526b, respectively, and are machined from a suitable annular metal ring. The chevron seals 528a and 528b are of polymeric material and are preferably of the same material as polymeric chevron seals 28, 128. The spacers 537a and 537b are of a suitable steel or stainless steel material.

The seal assembly 517 provides a bidirectional seal between the inner wall 15 and the outer wall 14 when used in place of the seal assembly 17 shown in FIGS. 1-3 and described above. The subassembly 524a seals against fluid leakage in one direction when exposed to a pressure that is greater in the region 18 than in the region 19. The subassembly 524b seals against pressure in the opposite direction when exposed to a pressure that is greater in the region 19 than in the region 18. If sealing in only one direction is required by the application, one of the subassemblies may be used without the other to provide a unidirectional seal assembly. The combination of at least one polymeric chevron seal (that is, the chevron seal 528a or 528b) with at least one metal chevron seal (that is, the chevron seal 527a or 527b) provides a subterranean seal assembly that maintains sealing function at high pressure differentials across the seal assembly and at high temperatures even after repeated assembly into and disassembly out of the annular space 16. The integral one piece metal chevron seal and spacer provides accurate alignment of the chevron seal.

Figure 9:
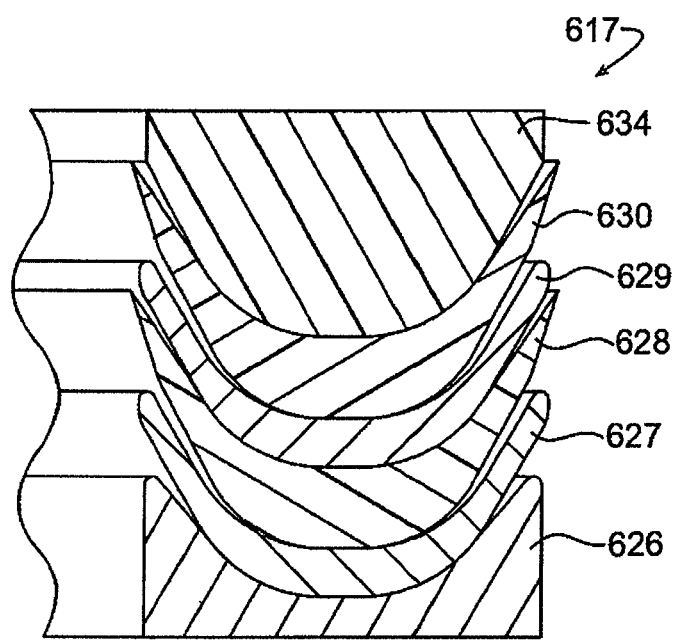
FIG. 9 is a longitudinal cross sectional view of a sixth embodiment of a subterranean seal assembly according to certain aspects of the present invention.

Referring now to FIG. 9, a sixth embodiment of a seal assembly 617 according to certain aspects of this invention is illustrated. The seal assembly 617 is illustrated in a free or un-deformed state, and the seal assembly 617 may be installed in the subterranean assembly illustrated in FIG. 2 in place of the seal assembly 17. Since the axial length of the assembly 617 is less than the axial length of the assembly 17, the cavity illustrated in FIG. 2 would preferably have a shorter axial extent when used with the assembly 617. The seal assembly 617 includes a metal spacer 626, chevron seals 627-630, and a spacer 634. The metal spacer 626 is identical to the spacer 26 described above with reference to FIGS. 1-3. The chevron seals 627 and 629 are identical to the chevron seals 27 and 29 described above with reference to FIGS. 1-3. The spacer 634 is of a suitable steel or stainless steel material.

The seal assembly 617 provides a unidirectional seal between the inner wall 15 and the outer wall 14 when used in place of the seal assembly 17 shown in FIGS. 1-3 and described above. The subassembly consisting of the chevron seals 627-630 seals against fluid leakage at a relatively higher pressure in one direction when exposed to a pressure that is greater in the region 18 than in the region 19. If sealing in two directions is required by the application, a second assembly facing in a direction opposite the direction of the seal assembly 617 may be added to the assembly shown in FIG. 9, in the manner illustrated in FIGS. 1-3. The combination of two or more metal chevron seals (that is, the chevron seals 627 and 629) with alternating polymeric chevron seals (that is, the chevron seals 628 and 630) provides a subterranean seal assembly that maintains sealing function at high pressure differentials across the seal assembly and at high temperatures even after repeated assembly into and disassembly out of the annular space 16.

Figure 10:
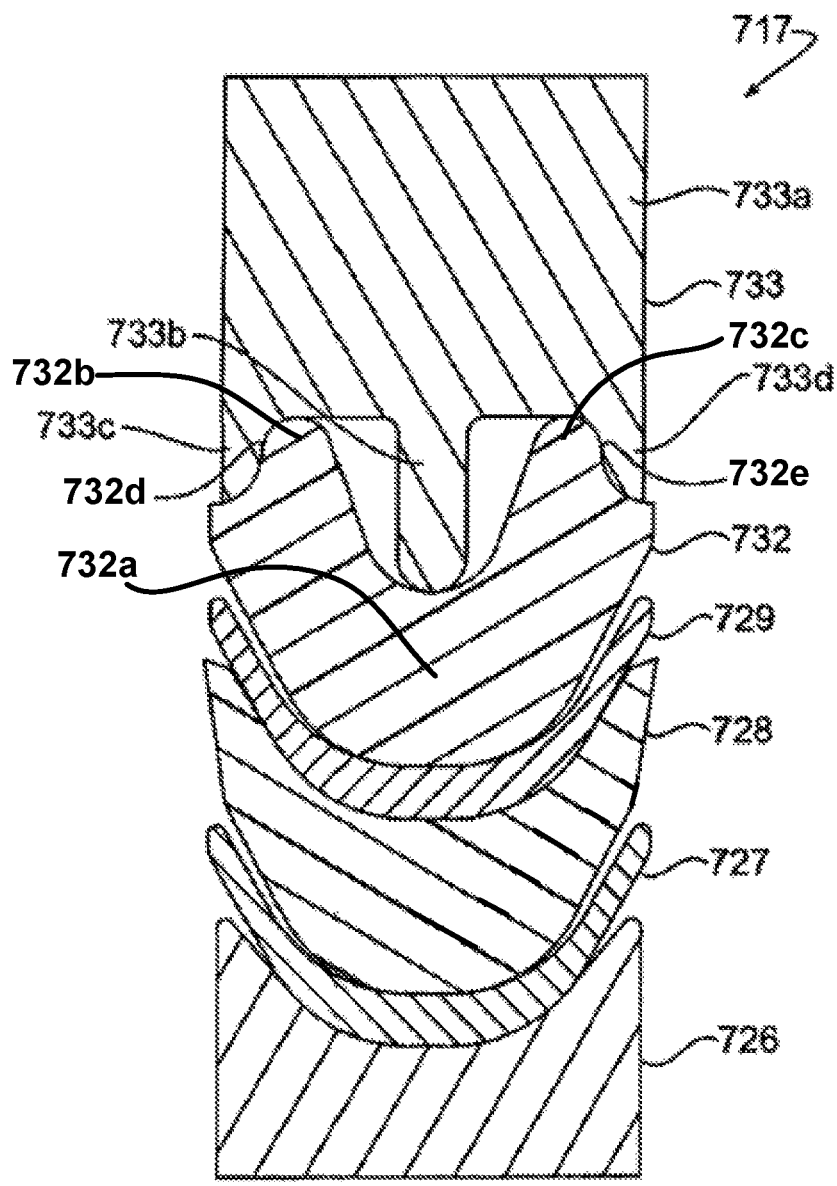
FIG. 10 is a longitudinal cross sectional view of a seventh embodiment of a subterranean seal assembly according to certain aspects of the present invention.

Referring now to FIG. 10, a seventh embodiment of a seal assembly 717 according to certain aspects of this invention is illustrated. The seal assembly 717 is illustrated in a free or un-deformed state, and the seal assembly 717 may be installed in the subterranean assembly illustrated in FIG. 2 in place of the seal assembly 17. Since the axial length of the assembly 717 is less than the axial length of the assembly 17, the cavity illustrated in FIG. 2 would preferably have a shorter axial extent when used with the assembly 717. The seal assembly 717 includes a metal spacer 726, chevron seals 727-729, and a scraper assembly 732, 733. The metal spacer 726 is identical to the spacer 26 described above with reference to FIGS. 1-3. The chevron seals 727 and 729 are identical to the chevron seals 27 and 29 described above with reference to FIGS. 1-3. The scraper assembly 732, 733 includes a scraper ring 732 and a scraper ring retainer 733. The scraper 732 is preferably of PEEK material, and the scraper retainer 733 is preferably of a suitable steel or stainless steel material. The scraper 732 includes two annular wings 732b and 732c extending radially and axially from a central body 732a. The central body 732a of the scraper 732 is nested within the wings of the metal chevron seal 729. The distal end region of the radially inner annular wing 732b of the scraper 732 includes a radially inwardly facing cut out portion 732d, and the distal end region of the radially outer annular wing 732c of the scraper 732 includes a radially outwardly facing cut out portion 732e. The scraper retainer 733 includes a central body portion 733a and an annular central ring portion 733b that is nested between the wings of the retainer 732. The scraper retainer 733 further includes annular wings 733c and 733d that extend into the cut out portions 732d and 732e, respectively. The annular wing 733c is radially aligned with and inwardly of the inner wing of the scraper 732, and the annular wing 733d is radially aligned with and outwardly of the outer wing of the scraper 732. The scraper retainer 733 aligns the scraper 732 and retains the scraper 732 in position. The radially inner and outer wings of the scraper 732 extend radially inwardly and radially outwardly respectively beyond the radial peripheral extent of the scraper retainer wings 733c and 733d to engage and scrape the cylindrical walls of the annular cavity in which the seal assembly 717 is located.

The seal assembly 717 provides a unidirectional seal between the inner wall 15 and the outer wall 14 when used in place of the seal assembly 17 shown in FIGS. 1-3 and described above. The subassembly consisting of the chevron seals 727-729 seals against fluid leakage at a relatively higher pressure in one direction when exposed to a pressure that is greater in the region 18 than in the region 19. If sealing in two directions is required by the application, a second assembly facing in a direction opposite the direction of the seal assembly 717 may be added to the assembly shown in FIG. 10, in the manner illustrated in FIGS. 1-3. The combination of two or more metal chevron seals (that is, the chevron seals 727 and 729) with an intermediate polymeric chevron seals (that is, the chevron seal 728) provides a subterranean seal assembly that maintains sealing function at high pressure differentials across the seal assembly and at high temperatures even after repeated assembly into and disassembly out of the annular space 16.

The metal chevron seals 27, 29 and 127, 129 illustrated in FIGS. 1-3 may preferably be formed, such as by roller forming or stamping, from a generally flat band of metal into the V-shape shown in the drawings. Alternatively, the metal chevron seals may be formed by machining from an annular metal ring. The metal material may be coated or uncoated, depending on the application. Typically, one or more of these seals are combined with other non-metallic seals to form a sealing system that blocks pressure in one direction. The metal chevron seal can also be used in a subassembly of two or more metal chevron seals without any other seals and can be stacked in series to add additional sealing redundancy. The sealing assembly will generally include spacers to hold the assembly in the cavity. The bidirectional embodiments shown in the drawings, other than that shown in FIG. 4, will pressure actuate either side of the seal assembly without exposing the other side of the seal assembly to a back pressure. Various combinations of the metal chevron seal are illustrated for various conditions of temperature and pressure. For the highest temperature and pressure conditions, multiple metal chevron seals with or without cooperating polymeric chevron seals may be used. For somewhat lower temperature and/or pressure conditions, fewer metal chevron seals with polymeric chevron seals may be used. Additional factors such as type of fluid, exposure to foreign contaminants, and repeating assembly and disassembly requirements, determine the number of metal chevron seals to be used, the scraper to be used (if any), and the number of polymeric chevron seals to be used (if any).

Presently preferred embodiments of the invention are shown in the drawings and described in detail above. The invention is not, however, limited to these specific embodiments. Various changes and modifications can be made to this invention without departing from its teachings, and the scope of this invention is defined by the claims set out below.

What is claimed is:

1. A subterranean assembly which comprises:
    (a) a generally cylindrical assembly which includes inner and outer generally concentric walls which define an annular space between them, and
    (b) an annular seal assembly with at least one chevron seal which is made of metal or metal alloy, the chevron seal including an annular central body and two annular wings extending radially and axially from the central body, one of the wings extending radially inwardly from the body to a distal annular end for sealing engagement with the generally cylindrical inner wall of the cylindrical assembly, the other wing extending radially outwardly from the body to another distal annular end and being arranged for sealing engagement with the generally cylindrical outer wall of the cylindrical assembly,
    in which the chevron seal has an unrestrained radial extent between the distal annular ends of the inner and outer wings which is greater than a radial extent of the annular space between the inner and outer walls of the cylindrical assembly so that the inner and outer wings are deflected towards one another and resiliently spring loaded against the inner and outer walls respectively.

2. The subterranean assembly as set forth in claim 1, including another chevron seal, the another chevron seal includes an annular central body and two annular wings extending radially and axially from the central body of the another chevron seal, one of the wings of the another chevron seal extends radially inwardly from its respective central body to a distal annular end for sealing engagement with the generally cylindrical inner surface, the other wing of the another chevron seal extends radially outwardly from its respective central body to a distal annular end for sealing engagement with the generally cylindrical outer surface, and the another chevron seal is of polymeric material.

3. The subterranean assembly as set forth in claim 2, including an annular scraper ring longitudinally aligned with the chevron seal.

4. The subterranean assembly as set forth in claim 3, in which the scraper ring includes inner and outer conical surfaces extending between axially separated distal ends, a juncture of the inner conical surface and one of the scraper ring distal ends defining an inner annular scraper for engagement with the generally cylindrical inner surface, and a juncture of the outer conical surface and the other of the scraper ring distal ends defining an outer annular scraper arranged for engagement with the generally cylindrical outer conical surface.

5. The subterranean assembly as set forth in claim 3, including an annular scraper ring retainer, the scraper ring and the scraper ring retainer each including two annular wings extending radially and axially from a central body, the scraper ring retainer further including a central ring radially intermediate the scraper ring retainer wings, the scraper ring retainer central ring projecting axially against the scraper ring central body, and the scraper ring retainer wings projecting both axially and radially against the scraper ring wings.

6. The subterranean assembly as set forth in claim 2, in which the central body of the polymeric chevron ring is nested within the wings of the metal chevron seal.

7. The subterranean assembly as set forth in claim 6, in which the central body of the polymeric chevron ring is substantially adjacent the central body of the metal chevron seal.

8. The subterranean assembly as set forth in claim 6, in which a major portion of the material of both wings of the polymeric chevron seal is disposed between the wings of the metal chevron seal.

9. The subterranean assembly as set forth in claim 1, including an annular spacer ring longitudinally aligned with the chevron seal central body.

10. The subterranean assembly as set forth in claim 9, in which the spacer ring is of metal or metal alloy and is of integral unitary construction with the chevron seal.

11. The subterranean assembly as set forth in claim 1, in which the inner metal chevron wing extends in substantially a straight line from the region of the wing adjacent the central body to the distal annular end and the outer metal chevron wing extends in substantially a straight line from the region of the wing adjacent the central body to the another distal annular end.

12. The subterranean assembly as set forth in claim 11, in which the thickness of each metal chevron wing is substantially uniform from the region of the wing adjacent the central body to the free distal end.

13. The subterranean assembly as set forth in claim 12, in which the thickness of the central body of the metal chevron seal is greater than the thickness of the wings.

14. The subterranean assembly as set forth in claim 1, including still another metal chevron ring.

15. The subterranean assembly as set forth in claim 14, including still another polymeric chevron ring.

16. The subterranean assembly as set forth in claim 15, in which the wings of the metal chevron seal extend axially in the same direction as the wings of the other metal chevron seal.

17. The subterranean assembly as set forth in claim 15, in which the wings of the metal chevron seal extend axially in the opposite direction as the wings of the other metal chevron seal.

18. The subterranean assembly as set forth in claim 1, in which the annular seal assembly is assembled in the annular space between the inner and outer concentric walls.

19. The subterranean assembly as set forth in claim 18, which is a wellbore assembly.

20. An annular scraper ring and an annular scraper ring retainer for an assembly, the assembly having generally cylindrical inner and outer generally concentric surfaces and an annular space between the surfaces, and the scraper ring and the scraper ring retainer comprising:
   each of the scraper ring and the scraper retainer ring including two annular wings extending radially and axially from a central body,
   the scraper ring retainer further including a central ring intermediate its annular wings, the scraper ring retainer central ring protecting axially against the scraper ring central body, and the scraper ring retainer wings projecting both axially and radially against the scraper ring wings, and
   the scraper ring wings each including a cut out portion facing radially away from the other scraper ring wing, and the scraper ring retainer wings each projecting into one of the cut out portions.

21. The scraper ring and the scraper ring retainer as set forth in claim 20, in which the scraper ring wings each further include a scraper extending radially beyond the outer peripheral extent of its adjacent scraper retainer wings.

22. The scraper ring and the scraper ring retainer as set forth claim 20, in which the scraper ring is of polymeric material and the scraper ring retainer is of metal or metal alloy.

\* \* \* \* \*